(12) United States Patent
Gearon

(10) Patent No.: US 7,628,739 B2
(45) Date of Patent: Dec. 8, 2009

(54) VARIABLE RESISTANCE DEVICE FOR AN EXERCISE MACHINE

(76) Inventor: Michael Gearon, 105 Smiths Lane, Clyde North, Victoria 3978 (AU)

(\*) Notice: Subject to any disclaimer, the term of this patent is extended or adjusted under 35 U.S.C. 154(b) by 285 days.

(21) Appl. No.: 10/486,062

(22) PCT Filed: Aug. 9, 2002

(86) PCT No.: PCT/AU02/01077

§ 371 (c)(1),
(2), (4) Date: Sep. 15, 2004

(87) PCT Pub. No.: WO03/013661

PCT Pub. Date: Feb. 20, 2003

(65) Prior Publication Data

US 2005/0014611 A1 Jan. 20, 2005

(30) Foreign Application Priority Data

Aug. 9, 2001 (AU) ..................... PR6875
Nov. 23, 2001 (AU) .................. 93392/01

(51) Int. Cl.
*A63B 21/008* (2006.01)
*A63B 22/04* (2006.01)
*A63B 22/06* (2006.01)
*A63B 69/16* (2006.01)
*A63B 71/00* (2006.01)
*F16D 57/00* (2006.01)

(52) U.S. Cl. ............... 482/112; 482/53; 482/58; 482/73; 188/290

(58) Field of Classification Search ............. 482/51–54, 482/55–59, 63, 72–73, 111–113; 434/247, 434/254; 472/127; 415/122.1, 123, 124, 415/124.1, 124.2; 188/266, 266.3, 290, 296, 188/313, 314; 418/6; 416/60; A63B 21/008, A63B 22/06, 69/06

See application file for complete search history.

(56) References Cited

U.S. PATENT DOCUMENTS 2,725,231 A * 11/1955 Hoover .................. 482/73

(Continued)

OTHER PUBLICATIONS

International PCT Patent Application No. PCT/AU02/01077, filed Aug. 9, 2002, International Publication No. WO 03/013661 A1, published Feb. 20, 2003 with PCT International Search Report.
PCT Notification Of Transmittal Of International Preliminary Examination Report and International Preliminary Examination Report.
Notification of Receipt Of Demand By Competent International Preliminary Examining Authority.

(Continued)

*Primary Examiner*—Loan H Thanh
*Assistant Examiner*—Oren Ginsberg
(74) *Attorney, Agent, or Firm*—Husch Blackwell Sanders Welsh & Katz; Gerald T. Shekleton

(57) ABSTRACT

A variable resistance device is adapted to be incorporated in an exercise machine to provide variable resistance. The device has a primary fluid chamber. A rotating mechanism rotates within the primary chamber. The rotation mechanism upon rotation encounters a degree of resistance dependent on the amount of fluid in the primary chamber. A secondary chamber is positioned within or proximate the primary chamber. The secondary chamber achieves and maintains an appropriate amount of the fluid in the primary chamber to provide a selected degree of resistance for the exercise machine. Fluid flows through the primary chamber into the secondary chamber and then back into the primary chamber. Variable control of the flow of fluid serves to establish and maintain the appropriate amount of fluid in the primary chamber required for a certain degree of resistance; and can provide differing degrees of resistance for the exercise machine.

23 Claims, 8 Drawing Sheets

U.S. PATENT DOCUMENTS

| | | | | |
|---|---|---|---|---|
| 3,081,634 | A * | 3/1963 | Blaszkowski | 73/379.09 |
| 3,211,396 | A * | 10/1965 | McQuillen | 242/156.2 |
| 3,266,801 | A * | 8/1966 | Johnson | 482/73 |
| 4,019,840 | A * | 4/1977 | Christy | 418/241 |
| 4,043,434 | A * | 8/1977 | Braschler | 188/296 |
| 4,146,222 | A * | 3/1979 | Hribar | 482/51 |
| 4,645,199 | A | 2/1987 | Bloemendaal | 272/73 |
| 4,784,385 | A * | 11/1988 | D'Angelo | 482/111 |
| 4,822,032 | A * | 4/1989 | Whitmore et al. | 482/63 |
| 4,864,872 | A * | 9/1989 | Stahl | 73/862.14 |
| 4,884,800 | A * | 12/1989 | Duke | 482/73 |
| 4,979,735 | A * | 12/1990 | Stewart | 482/113 |
| 5,110,118 | A * | 5/1992 | Winey | 482/73 |
| 5,120,200 | A * | 6/1992 | Carter, III | 417/295 |
| 5,183,453 | A * | 2/1993 | Yamashiro | 482/112 |
| 5,195,936 | A * | 3/1993 | Mao | 482/112 |
| 5,290,212 | A * | 3/1994 | Metcalf | 482/62 |
| 5,542,507 | A | 8/1996 | Warchocki et al. | 188/290 |
| 5,665,039 | A | 9/1997 | Wasserman et al. | 482/111 |
| 5,916,068 | A * | 6/1999 | Chisholm et al. | 482/61 |
| 5,944,637 | A * | 8/1999 | Stickler et al. | 482/61 |
| 6,561,955 | B1 * | 5/2003 | Dreissigacker et al. | 482/57 |
| 7,510,513 | B2 * | 3/2009 | De Figueiredo Silva | 482/113 |

OTHER PUBLICATIONS

PCT Chapter II Demand.
PCT Request.
International Search Report for related case No. PCT/AU02/01077.
European Search Report for related case No. EP 02748472.

* cited by examiner

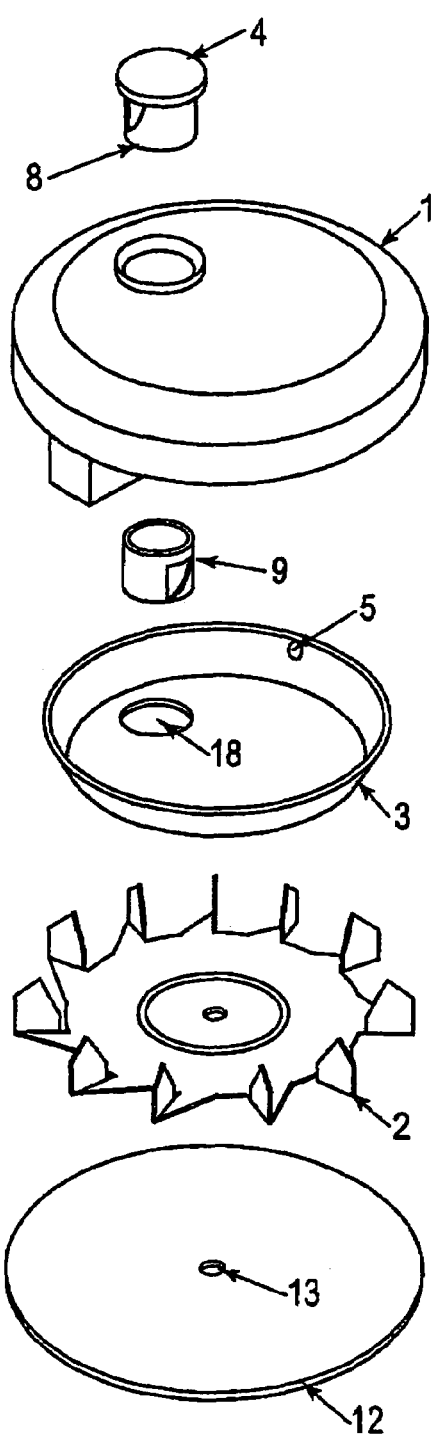
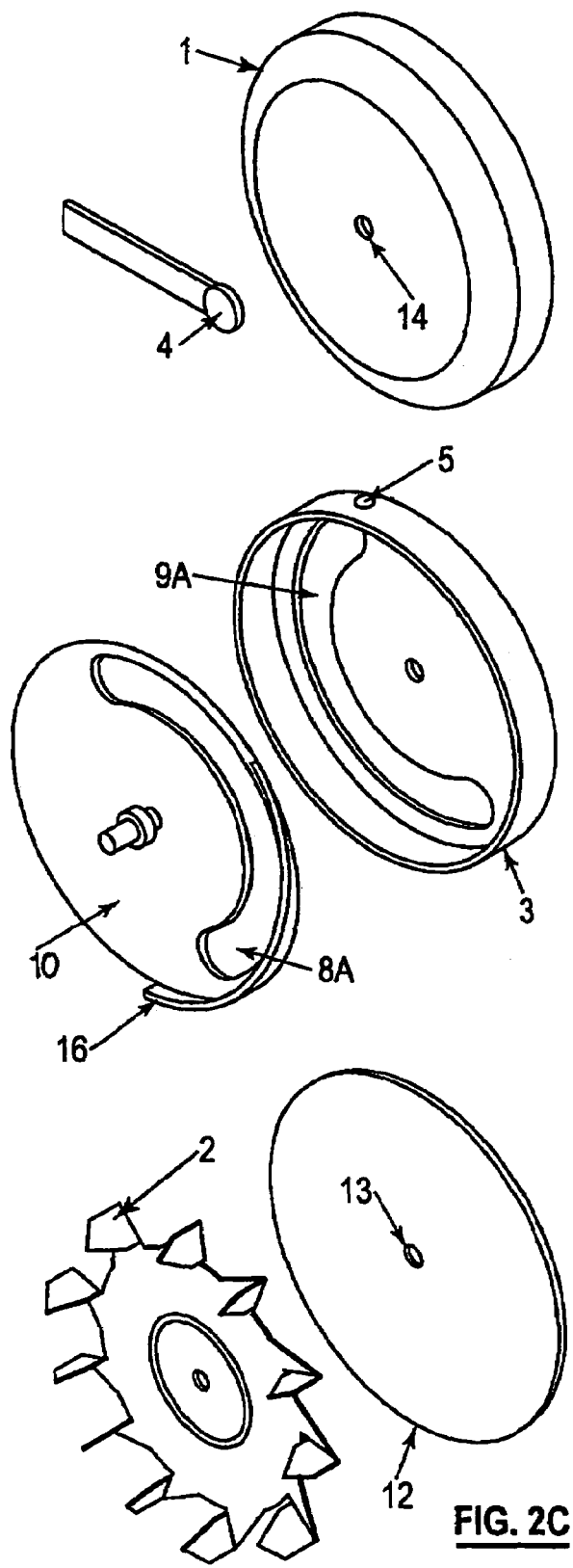
FIG. 1C
FIG. 2C

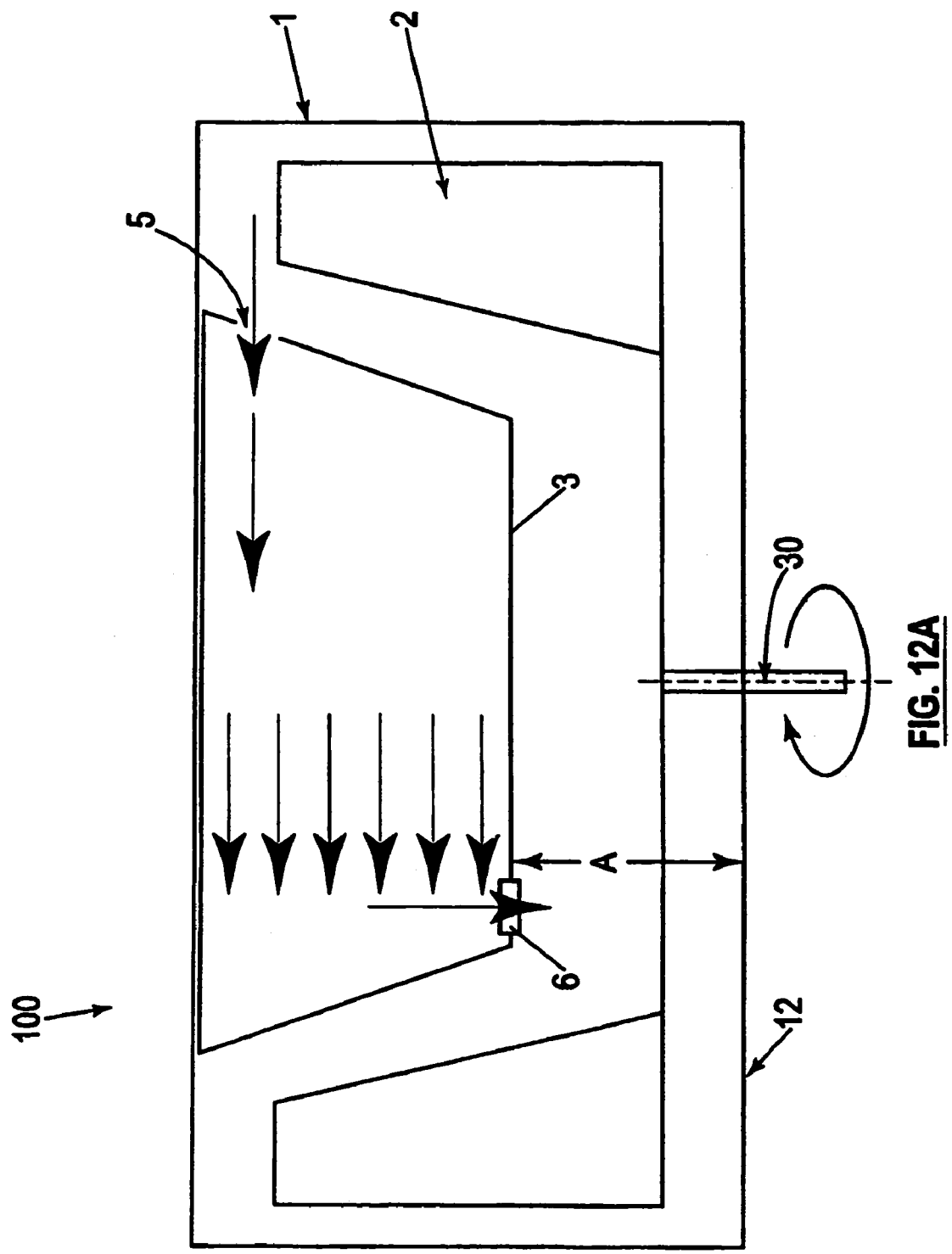

VARIABLE RESISTANCE DEVICE FOR AN EXERCISE MACHINE

CROSS REFERENCES TO RELATED APPLICATIONS

This application is based upon priority International Application PCT/AU02/01077 filed Aug. 9, 2002, International Publication No. WO 03/013661 A1 published Feb. 20, 2003, which is based upon priority Australian patent application PR6875 filed Aug. 9, 2001 and Australian patent application 93392/01 filed Nov. 23, 2001.

BACKGROUND OF THE INVENTION

1. Field of Invention

The present invention relates to a variable resistance device adapted to be incorporated in an exercise machine to provide a selectively-variable degree of resistance for the exercise machine.

2. Description of Prior Art

An exercise machine, by definition, needs to provide the user with a degree of resistance for muscular exercise. In almost all forms of exercise, there is a requirement in exercise machines for the degree of resistance to be varied.

First, there is the need for the user to vary the degree of resistance with a minimum of effort and complexity.

Second, another need is for the selected degree of resistance to be precise and repeatable. This is particularly so for resistance machines used by athletes who require a precise calibration of resistance values so that the values can act as a precise reference point for monitoring their exercise routines. As an example, sporting institutions would benefit from a precisely calibrated exercise machine for testing large numbers of athletes over a long period of years, so that there can be confidence that the degree of resistance used in a set of test exercises can be guaranteed to remain constant over the period of years. This degree of repeatability is often difficult to maintain, for instance, in exercise machines that use magnetic resistance, and wind resistance. In the case of magnetic resistance, the calibration of the magnets can alter over time. Wind resistance can be affected by the amount of atmospheric pressure, particularly when the same machine is used at different altitude levels.

There is also the need for the user to selectively change the degree of resistance, even within a workout. In PCT/US88/01580, International Publication WO88/08735 (Duke), an exercise machine, which simulates rowing, is provided with a resistance device which consists of a paddle that rotates in a cylindrical water-filled container. The degree of fluid in the container determines the degree of resistance experienced by the user. This prior art machine is provided with a handle connected to a drive cord. The user pulls and releases the drive cord, thereby simulating the stroke an oar when rowing a boat. However, in this prior art device, resistance is varied by a cumbersome method of wrapping a greater or lesser quantity of strap around the drive spool. It is believed that this increases or decreases the tangential forces as the circumference is increased or decreased.

Moreover, this manner of varying the resistance does not readily provide an accurate repeatable degree of resistance, since the user might not know how much cord has been wrapped, nor how much cord remains unwrapped. Also, the range of resistance-afforded by wrapping and unwrapping a cord-is narrow in range, so that the user does not have the benefit of using a wide range of resistance values.

In the prior art, which relate to resistance in the form of paddles that rotate in baths of water, there are systems which involve a first and second chamber, wherein liquid is transferred between the chambers so as to vary the amount of liquid in the primary container in which the paddle rotates, for example U.S. Pat. No. 5,944,637 (Stickler), and U.S. Pat. No. 5,195,936 (Mao). In these prior art, however, the liquid is forced from a first chamber into a second chamber through the same aperture or apertures. In other words, there is a two-way flow of liquid through the same aperture. Thus, these prior art apparatus must be provided with complex mechanisms needed to force the liquid through the same aperture, initially, in a first direction, then back through the same aperture in a second direction. The need for applying such forces means that the exercise machines require complex and thus more expensive mechanisms to force the liquid in and out of the apertures which link the chambers.

An objective of the present invention is to overcome or at least ameliorate one or more of the above problems in the prior art, or to provide an improved alternative.

BRIEF SUMMARY OF THE INVENTION

According to the present invention, there is provided a variable resistance device adapted to be incorporated in an exercise machine to provide selectively variable resistance therefor, the device including: a primary fluid chamber adapted to receive fluid therein, the primary chamber having a primary fluid flow region; a rotation mechanism positioned and adapted to rotate within the primary fluid flow region such that the rotation mechanism upon rotation encounters a degree of resistance dependent on the amount of fluid in the primary fluid chamber, the rotation mechanism being adapted to be rotated by rotational input from the exercise machine; a secondary mechanism adapted to achieve and maintain an appropriate amount of the fluid in the primary fluid chamber to provide a selected degree of resistance for the exercise machine, the secondary mechanism having a secondary fluid flow region; a fluid flow circuit, which includes said primary and secondary fluid flow regions, through which circuit the fluid flows to establish a circuit-flow condition that repetitively cycles around the circuit from the primary fluid flow region into the secondary fluid flow region and then back into the primary fluid flow region, the circuit-flow condition being adapted to establish and maintain said appropriate amount of fluid in the primary fluid chamber during use; and a variation means or controller for variably controlling flow of fluid through the circuit to selectively establish different circuit-flow conditions each corresponding to a different appropriate amount of the fluid in the primary fluid chamber to provide a different degree of resistance for the exercise machine.

Preferably, the secondary mechanism includes a secondary fluid chamber adapted to receive fluid therein, the secondary fluid chamber having said secondary fluid flow region.

Preferably, the amount of fluid in the primary fluid chamber is able to be ascertained by measuring the level of fluid in the secondary fluid chamber.

In one embodiment, the secondary fluid chamber may be positioned externally to the primary fluid chamber.

In other embodiments, the secondary fluid chamber may be positioned internally within the primary fluid chamber.

Preferably, the primary fluid flow region of the primary fluid chamber is defined by inner surfaces of the primary fluid chamber and by outer surfaces of the secondary fluid chamber.

Preferably, the inner surfaces of the primary fluid chamber form a first circle, and the outer surfaces of the secondary fluid chamber form a second circle which is concentric and coaxial with the first circle, the primary fluid flow region being generally between two circles.

Preferably, the primary fluid flow region generally surrounds the secondary fluid chamber.

In one embodiment, the primary fluid flow region may be arranged substantially horizontally.

Preferably, the primary fluid flow region further includes a space which is within the second circle and which is beneath the secondary fluid chamber, the space defining a gap between an external undersurface of the secondary fluid chamber and an inner surface of the primary fluid chamber.

In some embodiments, the gap may be insufficient for a fluid whirlpool to be created under the secondary fluid chamber when the fluid flows in the primary fluid flow region.

In some embodiments, the primary fluid flow region may be arranged generally upright.

In an example of the upright embodiment, in use, when the user provides the rotational input, the fluid moves around the primary fluid flow region of the primary fluid chamber and also through the fluid flow circuit, and when the user ceases providing the rotational input, the fluid in the uprightly-oriented primary chamber falls to bottom of the primary fluid chamber thereby acting as a body of fluid that stops the rotation of the rotation mechanism.

In some embodiments, the inner surfaces of the primary fluid chamber and/or the outer surfaces of the secondary fluid chamber may be provided with baffles to hinder the flow of fluid in the primary fluid chamber.

Preferably, the gap is sufficient for a fluid whirlpool to be created under the secondary fluid chamber when the fluid swirls around in the primary fluid flow region, the primary fluid flow region being shaped so that the whirlpool is able to continue swirling freely even after cessation of the input from the exercise machine to the rotation mechanism.

Preferably, the secondary mechanism is provided with inlet means that allows fluid to flow from the primary flow region into the secondary flow region.

Preferably, the variation means variably controls the flow of fluid through the inlet means.

Preferably, the secondary mechanism is provided with outlet means that allows fluid to flow out of the secondary flow region back into the primary flow region.

Preferably, the variation means variably controls the flow of fluid through the outlet means.

Preferably, the variation means variably controls the flow of fluid through the outlet means by raising or lowering the height position of the outlet means.

Alternatively, the variation means variably controls the flow of fluid through the outlet means by increasing or decreasing the flow-through size of the outlet means.

The fluid may be water or other suitable fluid.

Preferably, the fluid flow circuit is open to the atmosphere and is not of a hydraulic-nature.

Preferably, the fluid in the fluid flow circuit is constant in amount.

The rotation mechanism may be directly connected to the rotational input from the exercise machine without the need for a transmission and/or step-up system.

The exercise machine, for example, may be an exercise bicycle, or a rowing-simulating exercise machine.

In some embodiments, a transmission arrangement may be provided to alter the rate of rotation from the exercise machine such that the rotation mechanism receives a different rotational rate of input.

According to another aspect of the invention, there is provided a similar variable resistance device except that, instead of including the rotation mechanism, a reciprocating mechanism is positioned and adapted to reciprocate within the primary fluid flow region such that the reciprocating mechanism upon reciprocation encounters a degree of resistance dependent on the amount of fluid in the primary fluid chamber, the reciprocating mechanism being adapted to be reciprocate by mechanical input from the exercise machine.

A more detailed explanation of the invention is provided in the following description and appended claims taken in connection with the accompanying drawings.

BRIEF DESCRIPTION OF THE DRAWINGS

In order that the present invention might be more fully understood, embodiments of the invention will be described, by way of example only, with reference to the accompanying drawings, in which:

FIG. 1C is an exploded view of various components of the variable resistance device;

FIG. 1DD is a schematic view identical to FIG. 1D save that the two openings shown have a different degree of overlap;

FIG. 2C illustrates an exploded view of various components of the vertically-oriented embodiment of a variable resistance device;

FIG. 12A illustrates a horizontal embodiment of a variable resistance device, in which the diagram has been simplified in order to highlight principals of operation of the device.

Figure 10:
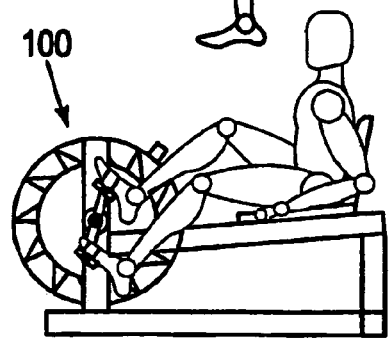
Figure 11:
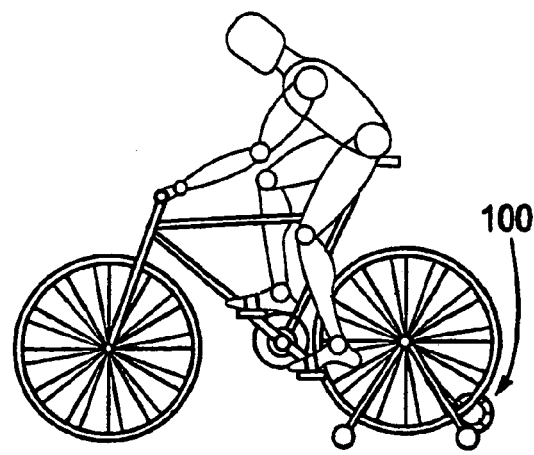
Figure 12B:
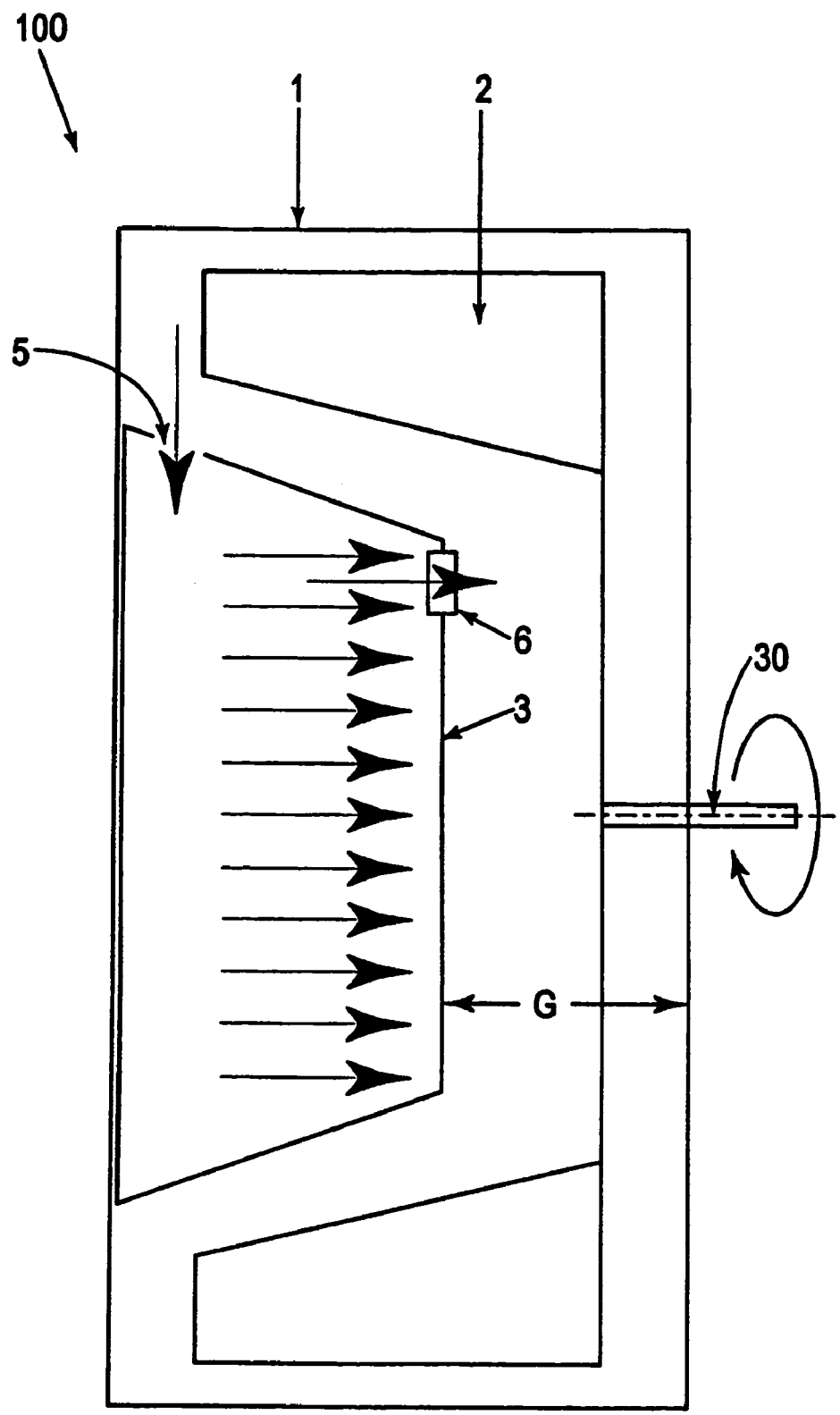
FIG. 12B illustrates a vertical embodiment of a variable resistance device in which the diagram has also be simplified in order to highlight the operating principle.

The diagrams in FIGS. 12B and 12A show embodiments illustrated in a simplified form merely in order to facilitate understanding of the function of various embodiments of the invention, and that the actual configuration of exemplary embodiments of these items are more fully illustrated in FIG. 1A to FIG. 11.

In the drawings, like components, or those with analogous function, are referred to with like numerals, merely for ease of understanding the description.

For this reason, some components with different shape and configuration, in the various embodiments, have been provided with the same reference numerals in the drawings to aid understanding of the specification.

In the drawings, the relative dimensions of some of the components have been exaggerated in size merely for clarity in understanding the drawings.

In FIGS. 3A, 3B, 4A, 4B and 5, the grid of dotted lines serve to indicate examples of liquid levels.

DETAILED DESCRIPTION OF THE INVENTION

A detailed description of the preferred embodiments and best modes for practicing the invention are described herein.

Before describing some exemplary embodiments in detail in relation to FIGS. 1A to 11, first of all, for the sake of ease of understanding the overall concepts, reference is made first to the simplified drawings in FIGS. 12A and 12B.

Incorporation in Exercise Machines

FIG. 12A relates to a simplified diagram showing components of an embodiment of a variable resistance device 100. The device 100 is adapted to be incorporated in an exercise machine in order to provide resistance against which the user performs the exercise on the machine. The device 100 may be incorporated in a range of exercise machines, for example, such as the machines in FIGS. 6 to 11.

Figure 6:
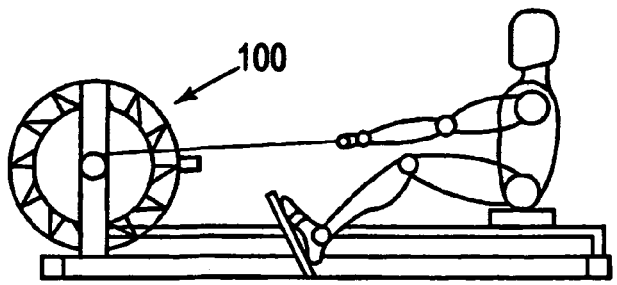
FIGS. 6 to 11 illustrate the incorporation of embodiments of the variable resistance device in various types of different exercise machines.
Figure 7:
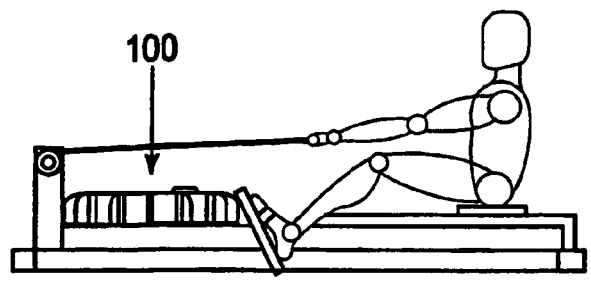

FIGS. 6 and 7 show the variable resistance device 100 incorporated in examples of exercise machines. For instance, FIGS. 6 and 7 show the device 100 in a rowing-simulating machine, with the device 100 being arranged respectively upright and horizontally.

Figure 8:
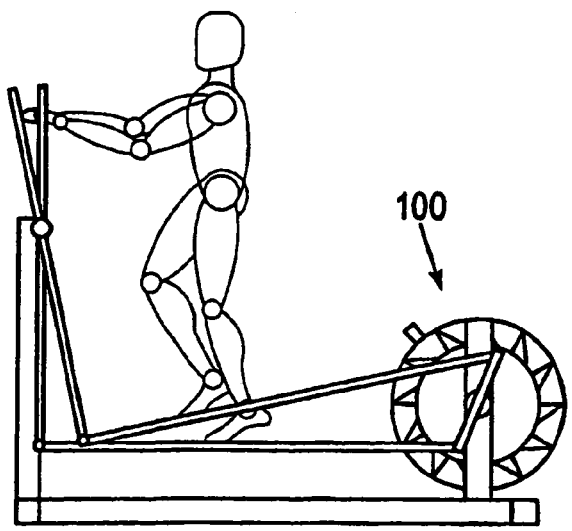

FIG. 8 shows the device 100 incorporated in a running-simulating machine in the form of an elliptical stepper machine.

Figure 9:
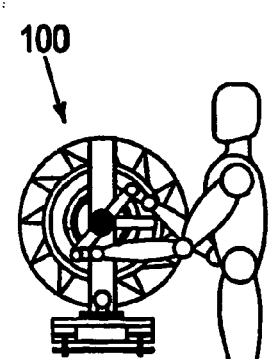

FIG. 9 shows the device 100 incorporated in a upper-body exercise machine.

FIG. 10 shows the device 100 in a seated-pedaling machine, known as a recumbent cycle.

FIG. 11 shows the device 100 incorporated in a stationary exercise bicycle, known as an upright cycle.

The embodiments of variable-resistance devices can be incorporated into these known exercise machines using known linking mechanisms, and hence the present invention is not restricted to any one form of linking mechanism. The function of a linking mechanism is merely to translate rotational input, generated by the user's exercise motion, to cause rotation of a rotation mechanism in the device 100. The rotation mechanism is rotated by rotational input from the exercise machine. The linking mechanism is not part of the present invention, and would be regarded more appropriately as part of the exercise machine itself.

An example of an exercise machine linked to a prior art resistance device is found in PCT/US88/01580, International Publication Number WO 88/08735 in the name of Duke. The details of the Duke machine and linking mechanism are incorporated into this present description by reference, but merely as an example of an exercise machine and a linking mechanism. There is no inference that the variable resistance device of the present invention is disclosed in the Duke prior art.

A further example of an exercise machine is U.S. Pat. No. 4,396,188 in the name of Dreissigacker, which relates to an exercise machine that uses a rotatable fan-type flywheel, relying on air-resistance. The details of the Dreissigacker machine and linking mechanism are incorporated into this present description by reference, but merely as another example of a different exercise machine and linking mechanism. There is no inference that the variable resistance device of the present invention is disclosed in the Dreissigacker prior art.

The variable resistance device of the present invention is adapted to be incorporated in a range of exercise machines, and is not limited to a particular exercise machine or linking mechanism.

The rotation input from the exercise machine can be directly coupled to the rotational mechanism in the form of a rotating spindle 30 having a set of rotating vanes 2 which rotate about a common axis of the spindle. In FIG. 2C, the axis of the spindle fits through a hole 13 in the base 12 of the primary chamber 1.

The rotation mechanism is directly connected to the rotational input from the exercise machine. Some embodiments may or may not require a transmission and/or step-up system.

The speed of rotation depends to an extent on the nature of the particular exercise machine. Some direct drive machines, such as the arm rower of FIGS. 6 and 7, would be used at rotational speeds of 30 to 100 r. p. m. Others exercise machines require ramped up transmission drive cycles that enable rotation speed of 60 to 100 r. p. m., generated by the user's body motion, to be translated or stepped up to rotational speeds of 600 to 1000 r. p. m.

The large amount of liquid in the overall device 100 acts as a coolant which absorbs any heat that may be generated from the work associated with rotation.

Some embodiments of the invention do not require a transmission or step up system, because the rotational speed achieved by a user, for instance, pedaling an exercise bicycle is around 60 r. p. m. or so, even up to around 100 r. p. m., which is suitably in the range of speeds at which the present embodiments can operate. In contrast, other resistance mechanisms, such as friction belts, tend to be jerky at such slow rotation speeds, because sufficient speed is required to overcome the initial resistance inherent in these systems. Magnetic resistance systems also require sufficient rotational speed. Whereas, the present embodiments are suitable for operating at rotation speeds that can readily be achieved by human muscle power. Also, the present embodiments are suited for direct drive connection to the exercise machine because the degree of resistance provided by liquids, such as water, are of the order of magnitude that can be directly used for exercise. In contrast, the resistance offered by other prior art systems, such as magnetic or air resistance, are usually much higher or lower than the range of resistance preferred by users. Hence, some form of transmission is required to increase or decrease the load. Hence, in those prior art systems, direct drive is rarely feasible. Thus, the present embodiments are ideally suited for direct drive connections, thus avoiding the higher cost and size associated with transmission step-up systems.

An advantage of direct drive systems is that there is less "ramp up" required for the user to overcome, since the user initiates the exercise by starting the swirl the fluid or water in the primary chamber 1, whereas in transmission drive systems there is often a substantial degree of inertia and a degree of friction inherent in the resistance components, such as the magnetic resistance components or the belt drive components. For example, it can be appreciated that it would be easier for a user to start swirling a paddle in water, compared with overcoming the initial friction of a belt drive system. Thus, direct drive systems, for which the present embodiments are well suited, are ideal for exercise machines used in rehabilitation programs where the users often do not have normal muscle function, which causes the initial "ramp up" of prior art systems to pose a problem, which would not be the case for healthy users.

Thus, those embodiments of the invention that are used in direct drive systems are particularly useful for rehabilitation exercise programs. Direct drive embodiments are also useful for rowing-simulating exercise machines.

Alternatively in other embodiments, however, a variable transmission device may be used to connect the rotation input to the rotating spindle 30, so as to adjust the ratio of the relative rotational speeds. This is particularly the case for exercise machines for general use, since some forms of exercise may not generate sufficient rotational speed to generate a suitable degree of resistance from the resistance device 100.

In the embodiments where there is a direct drive connection, the absence of a transmission mechanism allows the exercise machine to cost less and be simpler to manufacture.

Provision of Resistance

The present embodiment of the variable distance device 100 provides a range of different degrees of resistance that can be varied selectively by the user.

In FIG. 12A, the device 100 includes a primary fluid chamber 1 which is shaped as a squat cylindrical chamber with a base 12, filled with an amount of fluid (the fluid level is not shown in the diagram). In this simplified diagram of FIG. 12A, the primary chamber 1 is arranged generally horizontally.

The rotating vanes 2 rotate within the primary chamber 1. The vanes 2 rotate in the liquid flow region of the primary chamber 1 such that the vanes encounter a degree of resistance dependent on the amount of fluid in the primary chamber 1. A more detailed illustration of the vanes 2 is in FIG. 1C.

In FIG. 12A, the vanes 2 rotate about the central axis of a transmission shaft or spindle 30. In this embodiment, the spindle 30 is oriented upright or vertical.

The spindle 30 is connected to a linking mechanism of the exercise machine. The spindle 30 receives rotational input from the exercise machine via the linking mechanism. In use, the exercising action of the user on the exercise machine is translated, by the linking mechanism, into rotational motion of the vanes 2.

Figure 3A:
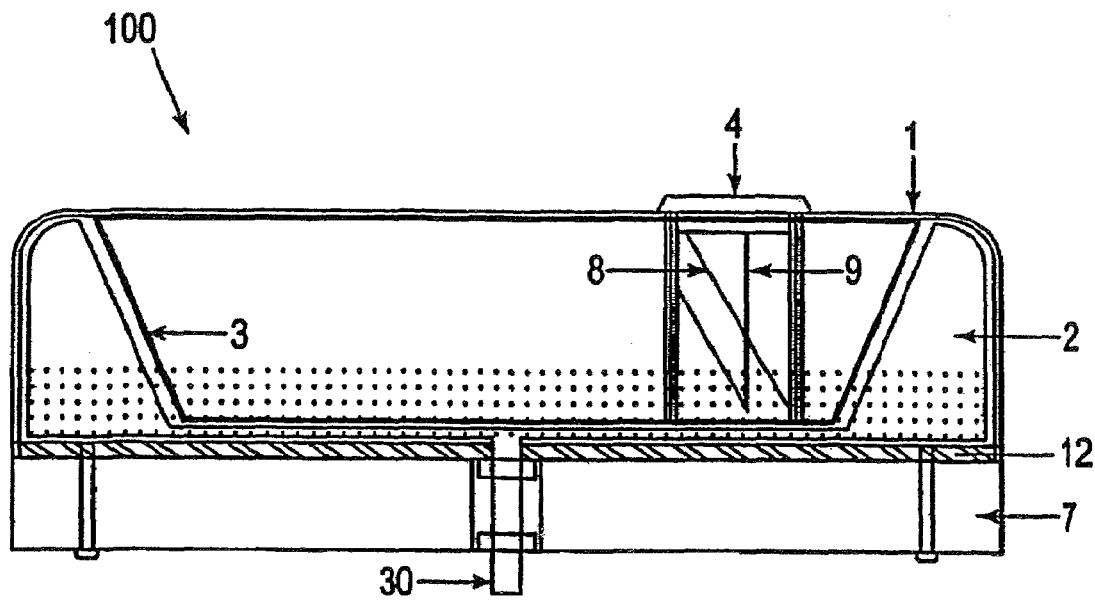
FIG. 3A illustrates a cross-sectional view of a horizontal embodiment of a variable resistance device.

A more detailed illustration of the embodiment of FIG. 12A is shown in FIG. 3A.

In FIGS. 3A and 12A, in order to provide a degree of resistance for the user's workout, the primary chamber 1 is filled with an amount of fluid which resists the rotation of the vanes 2. (The fluid level is illustrated as dotted lines in FIG. 3A).

Figure 1A:
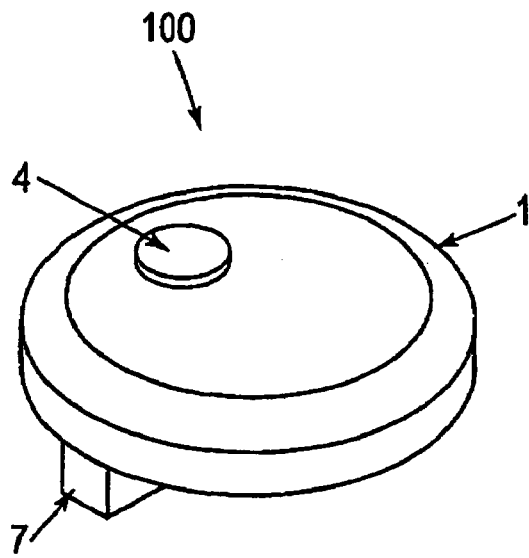
FIG. 1A illustrates an embodiment of an external cover member for a primary fluid chamber.
Figure 1B:
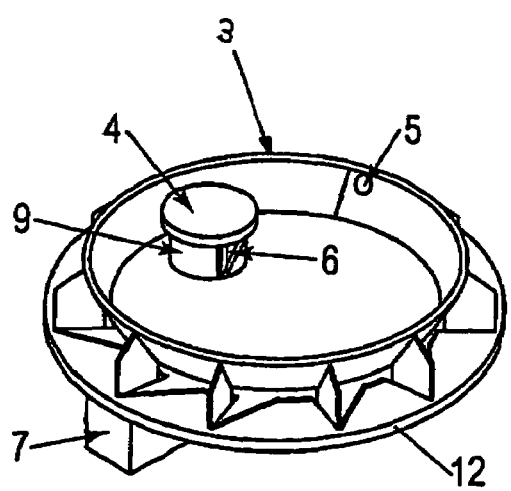
FIG. 1B illustrates a secondary fluid chamber surrounded by a rotating set of vanes, except with the cover member removed to show the inside of the secondary chamber and with the side wall of the primary chamber also omitted for clarity.

Having described the simplified diagram of FIG. 12A, fuller illustrative details are shown in FIGS. 1A to 1C. FIG. 1A shows a fully assembled primary chamber 1. The primary chamber 1 is supported on a support beam 7.

FIG. 1B shows the primary chamber 1 containing the rotatable vanes 2. FIG. 1B shows the arrangement with the lid of the primary chamber removed to reveal the secondary chamber 3, having an inlet 5 and an outlet 6 incorporated in parts of a valve having an outer cylinder 9. (Note: in FIG. 1B as drawn, the upright side walls of the primary chamber 1 have been omitted to reveal the other components, and only the base 12 of the primary chamber 1 is shown).

Variation of Resistance

The degree of resistance, encountered by the rotating vanes 2, is dependent on the amount of fluid in the primary chamber 1. For instance, when there is a low fluid level in the primary chamber 1, the vanes 2 encounter a low degree of resistance. Conversely, if the primary chamber 1 has a greater amount of fluid, the vanes 2 encounter a higher degree of resistance.

In FIG. 12A, the amount of fluid in the overall device 100 is kept constant. Thus, changes in the amount of fluid in the primary chamber 1 is achieved by maintaining part of the total in a secondary mechanism having a secondary fluid chamber 3. The secondary mechanism achieves and maintains an appropriate amount of the fluid in the primary chamber 1 to provide a selected degree of resistance for the exercise machine. Therefore, in order to vary the fluid level in the primary chamber 1, i.e. to vary the resistance, part of the fluid is held in the secondary chamber 3.

In the embodiment, the secondary chamber is motionless with respect to the primary chamber 1.

For illustration, if there are 10 liters of fluid in the overall device 100, then establishing and maintaining an amount of seven liters in the secondary chamber 3 will ensure that only three liters remain in the primary chamber 1. Hence, these three liters of fluid will provide a relatively low degree of resistance.

If the user wishes to increase the resistance offered by the device 100, he alters the fluid flow through the circuit to establish a different circuit flow condition in which, for instance, four liters are retained in the secondary chamber 3, thus leaving six liters in the primary chamber 1. Hence, there is now double the amount of fluid in the primary chamber 1, which results in an increased degree of resistance afforded for the user's workout.

In the exemplary embodiments, the overall resistance device may contain around 14 liters of water. A user typically rotates the vanes 2 at around 60 r. p. m., which is around one cycle per second. Without being bound by particular experimental results, it is believed that around 7 liters of water can be moved around the circuit in around seven seconds. In exemplary embodiments, a rate of transfer of 1 liter per second, may be achieved between the primary and secondary chambers 1,3. Hence, the appropriate level of fluid needed for a particular degree of resistance can be established fairly rapidly.

In another example, in a non-limiting embodiment which houses 10 liters of fluid, changes in resistance were found to be surprisingly fast. Increases up to the maximum resistance level seem to the user to be almost instant. In the embodiment, decreases in resistance level also appeared to user as being almost instant. For example, decreases of over half of the possible resistance range were achieved by a few slow cycles of the flywheel taking no more than a few seconds.

In various embodiments, the size and location of the inlets and outlets of the device, and other size parameters, can be varied, with some experimentation, to achieve the desired degree of flow rate around the circuit, for example 1 liter per second.

Fluid Flow Circuit

Fluid flowing continuously between the primary 1 and secondary chambers 3 via a fluid flow circuit which includes those parts of the primary 1 and secondary 3 chambers through this fluid flows.

Fluid flows through the fluid flow circuit to establish a circuit-flow condition that cycles around the circuit repetitively from the primary fluid flow region into the secondary fluid flow region and then back into the primary fluid flow region and so forth. The circuit-flow condition establishes and maintains the appropriate amount of fluid in the primary chamber during use.

In the embodiment, the fluid flow circuit is open to the atmosphere and is not of a hydraulic-nature. In hydraulic systems, the hydraulic fluid must be pushed or forced through a closed system using a pump, whereas in the present embodiments the fluid is not pushed or forced. In hydraulic resistance exercise systems, resistance is regulated by restricting fluid flow, requiring the user to exert a greater amount of pressure on the hydraulic fluid to force the fluid through the hydraulic lines. In contrast, in the present embodiments, there is a natural circuit flow condition that is achieved as a result of the configuration of the components, and of the rotation of the vanes. There is, thus, no need for expensive devices that would otherwise be necessary for forcing pressurized hydraulic fluid. The embodiment can therefore be constructed less expensively since the need for strong pressurized containers, required for hydraulic systems, is avoided.

The primary chamber 1 has a fluid flow region that is defined by inner surfaces of the primary fluid chamber 1 and by outer surfaces of the secondary fluid chamber 3.

The inner surfaces of the primary fluid chamber 1 form a first circle, and the outer surfaces of the secondary fluid chamber 3 form a second circle which is concentric and coaxial with the first circle. The primary fluid flow region is generally between the two circles. The primary fluid flow region thus generally surrounds the secondary fluid chamber 3.

In the embodiment where the secondary chamber 3 is located within the primary chamber, an advantage is that a variable resistance capability is provided without an overall increase in the size dimensions of the resistance device.

In the embodiment in FIG. 12A, the primary fluid flow region further includes the space which is within the second circle and which is beneath the secondary fluid chamber 3. The space defines a gap A between an external undersurface of the secondary chamber 3 and an inner surface of the primary chamber 1.

It is important that a fluid flow circuit is established between the primary 1 and secondary 3 chambers. The fluid flow circuit is shown in FIG. 3A as a series of arrows.

In simplified FIG. 12A, the flow of fluid through the circuit is explained as follows: Fluid is initially contained in the primary chamber 1. As the vanes 2 spin around the spindle 30, turbulence is created in the primary chamber 1.

The secondary chamber 3 is provided with inlet means in the form of inlet 5. The inlet 5 allows fluid to flow from the primary flow region into the secondary flow region. The turbulence causes a portion of the fluid to enter the inlet 5, so that the secondary chamber 3 begins to fill with fluid. However, upon entering the secondary chamber 3, part of the fluid is able to leave the secondary chamber 3 through outlet means in the form of outlet 6. The outlet 6 allows fluid to flow out of the secondary flow region back into the primary flow region. Fluid leaving the secondary chamber through outlet 6 returns to the primary chamber 1. Thus, the fluid cycles around the fluid flow circuit, never returning via same path. In other words, for example, liquid flows through the outlet 6 only in one direction, which is from the secondary 3 into the primary chamber 1.

Figure 3B:
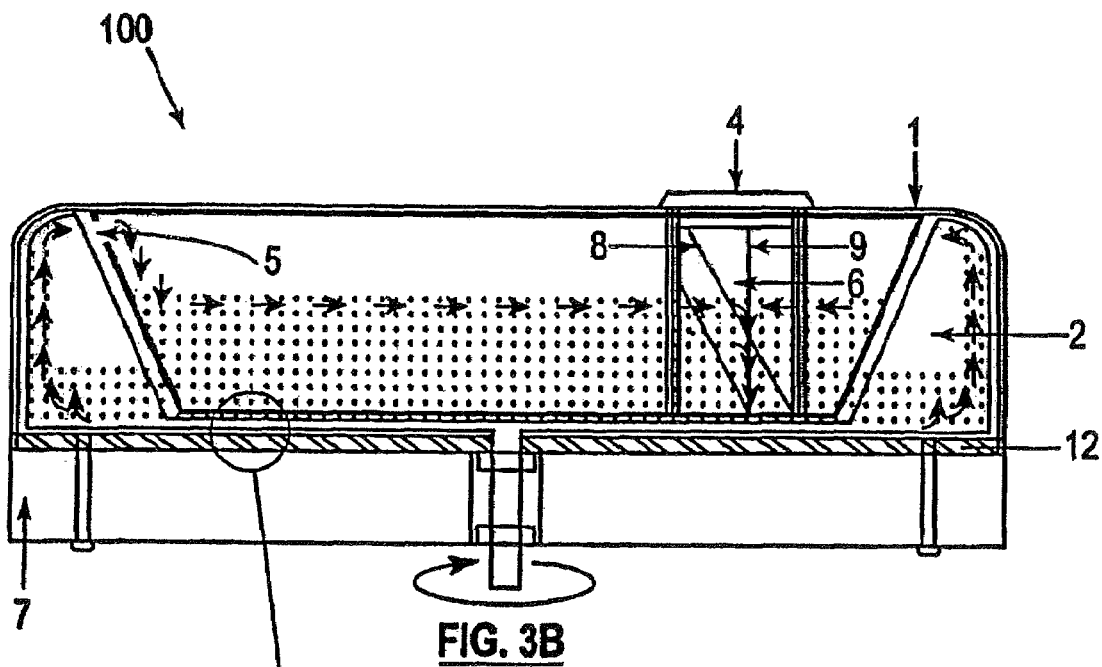
FIG. 3B illustrates the embodiment of FIG. 3A except shown with the dynamic fluid flow condition illustrated with arrows.
Figure 3C:
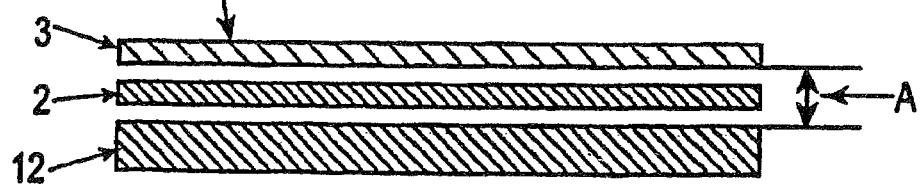
FIG. 3C relates to an expanded detail of a section taken from FIG. 3B.

In FIG. 12A and FIGS. 3A, and 3B, the side walls of the secondary chamber 3 are inclined and taper towards the base of the chamber 3. This allows the inlet 5, which in the embodiment is located close to the upper rim of the chamber 3, to be positioned as close as possible to the inner side wall of the primary chamber 1. This positioning is because of the fact that, during rotation, it is observed that much of the swirling fluid flows along the circumference of the inner side wall, so the positioning of the inlet 5 as close as possible to this location ensures it is located to readily receive fluid. A similar design rationale is found in the upright or vertical embodiments of FIGS. 4A and 4B.

In the horizontally-oriented embodiment of FIG. 3B, it can be seen the inlet 5 is positioned at the upper edge of the secondary chamber 3. The reason for this location is because, as the liquid in the primary chamber 1 is stirred by the vanes 2, the tendency is for some of the fluid to be pushed upwards (as shown with the small arrows). As the liquid is stirred by the vanes 2 up the side of the inner wall of the primary chamber 1, the fluid eventually meets the upper inner edge of the primary chamber 1, and thus the direction of the fluid is redirected inwardly towards the center of the primary chamber (as shown by the change in direction of the small arrows in FIG. 3B). Thus, the position of the inlet 5 is arranged so as to meet the direction of a part of the fluid flow in the primary chamber. In the embodiment of FIG. 3B, the upper inner edge is curved to enhance the re-direction of the fluid towards the location of the inlet 5.

Varying Resistance by Varying Amount of Fluid in Secondary Chamber

When fluid is in the secondary chamber 3, it is effectively taken out of the flow region of the primary chamber 1. Hence, to increase the resistance, more fluid is kept in the primary chamber 1, with less being in the secondary chamber 3. And vise versa, to reduce the resistance, less fluid is kept in the primary chamber 1, with more being in the secondary chamber 3.

Although it is the amount of fluid in the primary chamber 1 that determines the degree of resistance, the control of that resistance is achieved by controlling the fluid level in the secondary chamber 3.

The user can select the fluid level in the secondary chamber 3. The outlet 6 is controlled by a variation-means which provides a controller or device to enable the user to select the amount of fluid retained in the secondary chamber 3. The variation-means variably controls the flow of liquid through the outlet 6. The variation means variably controls the flow of liquid through the circuit to selectively establish different circuit-flow conditions, each corresponding to a different amount of the fluid in the primary fluid chamber. This variation enables the user to select a different degree of resistance for the exercise machine.

This ability to control the amount of fluid in the secondary chamber 3 effectively gives the user the ability to control the amount of fluid in the primary chamber 1. This is how the user controls the degree of resistance provided by the device 100.

The variation-means includes an outlet valve that controls the amount of fluid that leaves the secondary chamber 3. An example of a valve is shown in FIGS. 1A-C, 3A and 3B. However, before describing the example of the valve in detail, the broad concept of the valve is conceptually explained as follows:

Imagine a cylinder with a hole in a sidewall. (The cylinder mentioned in this paragraph, of course, is not part of the present description of embodiments, and is merely mentioned as an aid for explaining a concept). Even if there is a continual fluid flow into the cylinder, the fluid level in the cylinder never rises above the height of the hole, because the fluid leaves the cylinder at the height of the hole. Thus, a relatively constant fluid level, which is level with the height of the hole, can be maintained in the cylinder, simply because the flowing fluid cannot rise above the level of the hole. Consequentially, raising or lowering the fluid level in the cylinder is achieved by either raising or lowering the height position of the hole in the wall of the cylinder.

This concept, in the above paragraph, generally explains the function of the exemplary valve in FIGS. 1A-C, 3A and 3B.

Figure 1D:
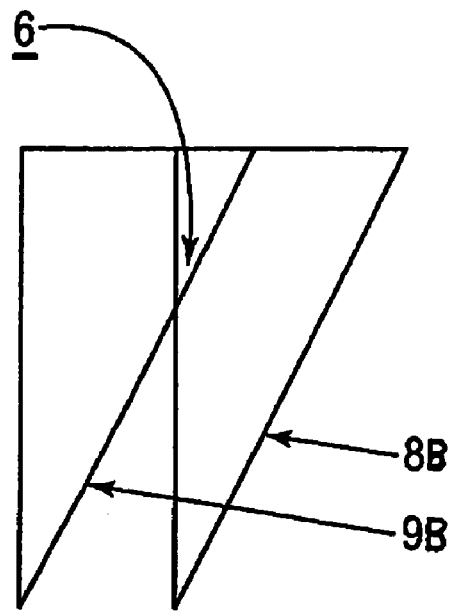
FIG. 1D is a schematic view of overlapping openings in cylindrical walls of inner and outer parts of a value assembly shown in FIG. 1C.
Figure 1D:
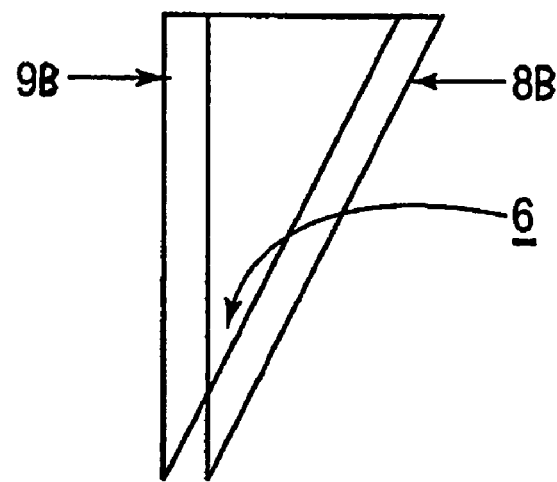

In FIG. 1C, the valve comprises an inner cylinder 8 which has a triangular opening which defines an inclined slit. The inner cylinder 8 has a knob 4 for the user to rotate the cylinder 8. The inner cylinder 8 rotates within an outer cylinder 9 which also has its own similarly-shaped triangular opening FIGS. 1D and 1DD, show that by rotating the knob 4 of the cylinder 8, the user can select the degree of overlap of the triangular openings 8B, 9B. In FIG. 1DD, there is a substantial degree of overlap of the triangular openings 8B, 9B. In FIG. 1DD, there is a substantial degree of overlap, so the lowermost level of the outlet 6 is close to the bottoms of the openings. Whereas in FIG. 1D, there is a lesser degree of overlap, and so the lowermost level of the outlet 6 is positioned at a greater height. Thus, by rotating the knob 4, the user controls the height of the outlet 6, which effectively allows the user to select the height of the fluid in the secondary chamber 3, which effectively allows control of the amount of fluid in the primary chamber 1. The raising of lowering of the effective height of the opening 6 results in a raising or lowering of the height of the storage volume of the secondary chamber 3.

In FIG. 1C, the outer cylinder 9 is fixed to the base of the secondary chamber 3 so that it fits over hole 18. Thus, fluid that leaves the secondary chamber through the outlet 6 in the valve will drop through hole 18 back into the primary chamber 1.

In a further embodiment, the rotating valve can be provided with an automatic rotation mechanism, for instance, powered by an electric motor, which can progressively increase or decrease the resistance over a stipulated period of time. For instance, the user might stipulate that the resistance is to increase from a first value to a second value over a period of 10 minutes. In an embodiment configured as a rowing machine, the degree of resistance can be changed in mid-stroke by moving a lever, or by the foregoing automated control. For instance, rowing coaches can train their rowing teams by providing progressively increasing resistance to simulate racing conditions.

In other embodiments, the variation-means may also includes a valve that controls the size and therefore the amount of liquid entering the inlet 5 (described below in the passage relating to the vertical or upright embodiment).

Calibration

The side wall of secondary chamber 3, or the valve is provided with a graduated series of markings, to allow the user to measure the liquid level in the secondary chamber 3.

The resistance device can be calibrated by operating the rotational device at a known rotational rate (r. p. m.), and then gauging the liquid level that is established in the secondary chamber 3 for that particular known rotational rate.

The rotational speed (r. p. m.) of the device may be monitored electronically. In this manner, a series of markings can be ascertained that correspond to a range of rotational rates.

A factor that enables the device 100 to be calibrated accurately is that the amount of fluid in the overall device is known. As mentioned above, for instance, if the overall fluid amount is 10 liters, then the amount of fluid in the primary chamber 1 is the difference between 10 liters and the number of liters in the secondary chamber 3. Hence, there is a need to periodically check that level of the total amount of fluid in the overall device 100. This is best checked when the device is at rest. To facilitate the ability to check the total amount of fluid, the secondary mechanism is provided with small openings that allow the water to leak out at a very slow rate, so that, when the device is at rest, the fluid in both the primary and secondary chambers can reach a rest-equilibrium level. The openings, in the embodiment, include the very slight gaps between the wall surfaces of the inner and outer cylinders 8,9. The openings may also comprise small holes in the side wall of the secondary chamber that allow fluid to seep out over an extended period of time when the resistance device 100 is at rest. It is emphasised that these openings are so small that they do not play any substantial part in the flow of fluid around the fluid flow circuit, and thus are not regarded as inlets and/or outlets. Thus, when the liquid reaches an rest or equilibrium level, as a result of the liquid level seeping through the openings, the user can obtain an indication of the total amount of liquid in the device 100. The sides of the primary chamber 1 may be provided with calibrated markings, so that the equilibrium-rest liquid level falls, perhaps due to evaporation, the liquid level can be topped up.

Advantage of the Fluid Flow Circuit

Fluid flows around this circuit only in this one general direction, as described above. In other words, the fluid only enters the secondary chamber 3 through the inlet 5 in one direction, and only leaves the secondary chamber at the height of outlet 6 in one direction. This "one-way flow" of fluid around the circuit is what gives the fluid flow the characteristic of a "circuit".

This is an important feature of the invention because, in this manner, the fluid is able to cycle within the circuit under the force of gravity, aided by the turbulence caused by the rotating vanes 2. There is no need to expend energy to work against this natural circuit flow cycle, which would indeed be the case if it were attempted to cause the fluid to flow against this natural cycle.

In contrast to the present embodiments, some of the prior art are incapable of replicating this advantage. For instance, in U.S. Pat. No. 5,944,637 (Stickler) in the prior art FIG. 10, fluid is forced in and out of a type of secondary chamber (87) through apertures 92 and 94. In that prior art, energy must be exerted to force the fluid in and out of the prior art secondary chamber (87). A similar deficiency is found in U.S. Pat. No. 5,195,936 (Mao) in the prior art FIG. 7, in which a sprocket wheel (38) is required for force fluid in and out of a type of secondary chamber, being in the form of a fluid bag 37. In either piece of prior art, there is an absence of a natural circuit flow cycle. This need, in the prior art, for apparatus to force fluid in and out through the same openings means, adds to the cost and complexity of the known apparatus, and also means that the user must exert greater effort in selecting a different degree of resistance.

Moreover, in the Mao prior art particularly, it takes a relatively long time to squeeze the fluid out of the fluid bag 37, whereas in the present embodiment the user simply has to rotate the knob 4 and can then re-commence exercising while the resistance device 100 adapts to the newly selected degree of resistance.

Thus the user is able to change the resistance level with one quick rotation of a knob 4, and the natural flow of the circuit flow condition adapts to create a new level of fluid in the secondary chamber 3, and hence the primary chamber 1.

In the present embodiment, as the fluid flows around the circuit, the user can select the degree of resistance simply by rotating the knob 4. By doing this, the user effectively selects the amount of fluid that is contained in the primary fluid chamber 1 (as explained above).

Gauging the Degree of Resistance

As the vanes 2 rotate about the spindle 30, the fluid in the primary chamber 1 will be extremely turbulent. In spite of the turbulence, it can be readily ascertained how much fluid is in the primary chamber, by referring to the relatively calm fluid level in the secondary chamber 3. Thus, the fluid level in the secondary chamber 3 provides an accurate indication of the amount of fluid in the primary chamber 1. In order to control the amount of fluid in the secondary chamber 3, the user simply has to change the height of the outlet 6.

In contrast to prior art resistance devices, such as those which use magnets or wind resistance, the level of fluid in the secondary chamber 3 provides an accurate and, importantly, a repeatable measure of the resistance of the exercise machine.

In embodiments, the degree of resistance is highly repeatable for the life of the apparatus. In the exemplary embodiment, there are no magnetic or electronic parts to move out of alignment or lose magnetism. Also, there is no reliance on air density which can vary at different altitudes. The need for constant calibration is minimized, which tends to be required in prior art systems that use friction belts, electronic and magnetic resistance mechanisms. In ergonometers that incorporate embodiments of the invention, the workload is able to be accurately calculated based on rotational speed (r. p. m.) of the device, and the amount of fluid present in the chambers. In such embodiments, there are no variables such as friction and heat, or variations in altitude for air systems, and no electromagnetic variables to could affect the settings.

In the prior art, when wear and tear occurs over time, the calibration of the magnetic resistance can alter from the original settings. In the case of machines that use wind-resistance, the true resistance can vary depending on atmospheric pressure depending on the geographic altitude. In contrast, in the present embodiment, relying on the fluid level of the secondary chamber 3 as a indication of resistance is not as subject to such variation, even when the machine has been used for a long period.

The calibration of the machine, described above, is dependent on factors that can be controlled, independent of the machine, for instance the known rotational calibrating speed. Also, the calibration is determined by the liquid level in the secondary chamber 3, which is unlikely to be significantly influenced by normal wear and tear of the present apparatus embodiment.

Embodiments with Whirlpool Effect

In the horizontal configuration in FIGS. 3A, 3B, 7, and 12A, as the vanes 2 rotate about the spindle 30, there is the possibility of a whirlpool being created in the central portion of the primary chamber 1. Whether or not a whirlpool is actually formed, depends on the height of the gap A shown in FIGS. 3C and 12A.

If the gap A is of sufficient height, there is sufficient space for a whirlpool to form in the centre of the primary fluid chamber 1. A fluid whirlpool to be created under the secondary chamber 3 when the fluid swirls in the primary fluid flow region. Since the primary fluid flow region is circular, the whirlpool is able to continue swirling freely even after cessation of the input from the exercise machine to the rotation mechanism. It is unlikely that a whirlpool could be generated in a non-circular flow region.

However, if the height of the gap A is very short, there is less tendency for a whirlpool to be created. The significance of the whirlpool is that the momentum of the swirling fluid would continue to rotating urge the vanes 2 around the spindle, even when the rotational input from the exercise machine ceases, i.e. when the user stops working at the exercise machine.

In the horizontal embodiment, the whirlpool effect is a preferred feature because it ensures that momentum of the rotating vanes 2 is maintained for a period, even when the user's rotational inputs stops for a moment. For instance, when the user of an exercise bicycle stops pedaling for a few seconds, the presence of momentum ensures that when the user resumes pedaling, there is no need to start the rotation of the vanes from a stationery start. In other words, the user can resume pedaling roughly with the same sense of resistance as when he stopped. Since the momentum is maintained due to the swirling whirlpool, such embodiments do not require heavy flywheels, which would be otherwise required to maintain a physical momentum flywheel.

Not all embodiments of the present invention have the whirlpool effect, but in those that do, the continued swirling of the fluid in the primary chamber 1, i.e. the whirlpool, can properly be regarded as a "liquid flywheel" because it is the movement of the liquid, itself, that is primarily responsible for keeping the vanes rotating. The vanes 2 are merely following the motion of the swirling fluid.

Embodiments without Whirlpool Effect

If there is no momentum to keep the vanes 2 rotating, when the user resumes pedaling, he must overcome the initial inertia of the stationary vanes 2.

In embodiments where there is no whirlpool effect to keep the fluid rotating, the momentum can be maintained by forming the vanes from a heavy material, which will tend to keep rotating for a longer period in the absence of the user's input from the exercise machine. In such cases, it would be inappropriate to refer to this as a "liquid flywheel" since the liquid, by itself, would tend to slow down because of the absence of the whirlpool. Thus, in cases where there is no whirlpool formed, the momentum is generated by the movement of the heavy rotating vanes 2, which act similarly to a "mechanical flywheel" known in the prior art; and not as a "liquid flywheel" which requires the gap A to be sufficiently large to create a whirlpool.

In other embodiments, the whirlpool effect can also be minimized by providing the inner surfaces of the primary chamber 1 and/or the outer surfaces of the secondary chamber 3 with baffles (not shown) to hinder the flow of fluid.

When baffles are present, the swirling of the fluid is substantially dampened once the rotational driving force of the vanes 2 ceases. Thus, the presence of baffles in the path of the primary fluid flow region minimizes or prevents a "liquid flywheel" from forming. A "liquid flywheel" assumes that the liquid would continue to rotate freely, whereas the presence of the baffles would effectively prevent that from happening. The baffles would effectively prevent free movement of liquid around the circular primary chamber 1

Vertical or Upright Configuration

Another configuration where there is no whirlpool effect is when the primary fluid chamber 1 is oriented upright, since there is no horizontally-oriented circular flow region for the fluid to continue swirling.

In the simplified diagram of FIG. 12B, a modified embodiment is shown in which the primary fluid chamber 1 is arranged upright or vertically. However, the function of device in FIG. 12B has similarities to the one in FIG. 12A.

Other upright configurations are shown in FIGS. 4A, 4B, 5, 6, 8, 9, 10 and 11.

In FIG. 12B, upon cessation of the rotational input from the exercise machine, the fluid in the upright primary chamber 1 tends to drop and collect on the bottom of the upright chamber 1. As can be seen in FIG. 12B, the upright gap G, which is between the exterior of the secondary chamber and the interior surface of the primary chamber, acts as a further path through which the fluid can quickly drop and collect on the bottom of the upright chamber 1. There is no liquid flywheel (where water continues would rotate under its own momentum in a circular manner around the rim). Indeed, in the vertical embodiment, the opposite to a liquid flywheel occurs, because the water drops to the bottom of the primary chamber. The water, collected at the bottom of the primary chamber 1 thereby acts as a body of fluid that hinders and ultimately stops the rotation of the vanes 2. In examples of embodiments of the present apparatus, the vanes 2 cease rotation in about 3 to 4 seconds upon the user ceasing to provide rotational input, whereas in prior art devices that rely on liquid-flywheels, the liquid in those prior art cases can continue to rotate or circle around the chamber under its own momentum for around 30 seconds. Thus the vertical or upright embodiment of the present invention cannot be regarded as a liquid flywheel.

In FIG. 12B, the spindle 30 is arranged generally horizontally. As the vanes 2 rotate about the spindle axis, the vanes 2 rotate through the primary chamber 1 in a manner akin to the vanes of a river water wheel. The secondary chamber 3 is motionless with respect to the primary chamber 1.

As the vanes 2 rotate, the vanes chum up the fluid and sweep the fluid up to the upper reaches of the primary chamber 1, and then the fluid falls back to the bottom of the chamber 1, all the time being driven by the rotating vanes 2. As this continues, a portion of the fluid enters the inlet 5 of the secondary chamber 3 causing the secondary chamber to fill up with fluid. In the vertical embodiment, the position of the inlet 5 is at or close to the top of the secondary chamber 3, such that the inlet 5 is in the general location where part of the fluid tends to drop down from the top of the upright primary chamber 1. Thus, even in the upright embodiment, the position of the inlet 5 is arranged so as to meet the direction of part of the fluid flow in the primary chamber As in the case in the horizontal configuration of FIG. 12A, there are also a fluid flow circuit is established in the vertical configuration of FIG. 12B, because fluid can leave the secondary chamber through outlet 6.

Here, once again, the amount of fluid contained in the primary chamber 1 is determined by the amount of fluid being retained in the secondary chamber 3.

Figure 2A:
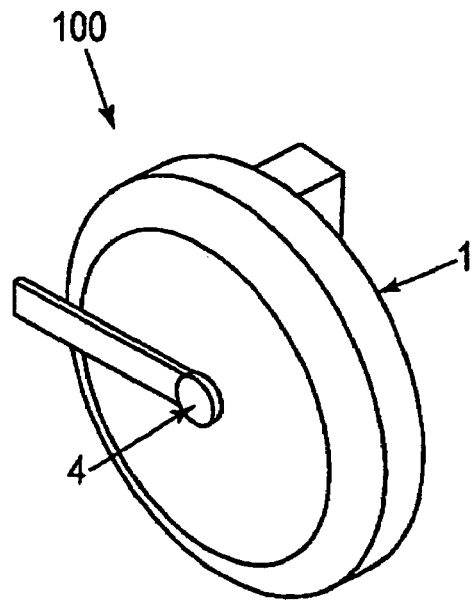
FIG. 2A is similar to FIG. 1A, except that the second embodiment relates to a vertical or upright configuration.
Figure 2B:
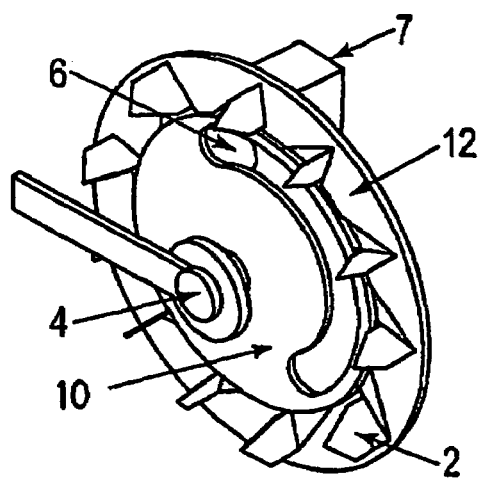
FIG. 2B illustrates a vertically-oriented secondary chamber surrounded by a rotatable set of vanes; except with the cover member removed to show the inside of the secondary chamber and with the side wall of both the primary and secondary chambers also omitted for clarity.
Figure 4A:
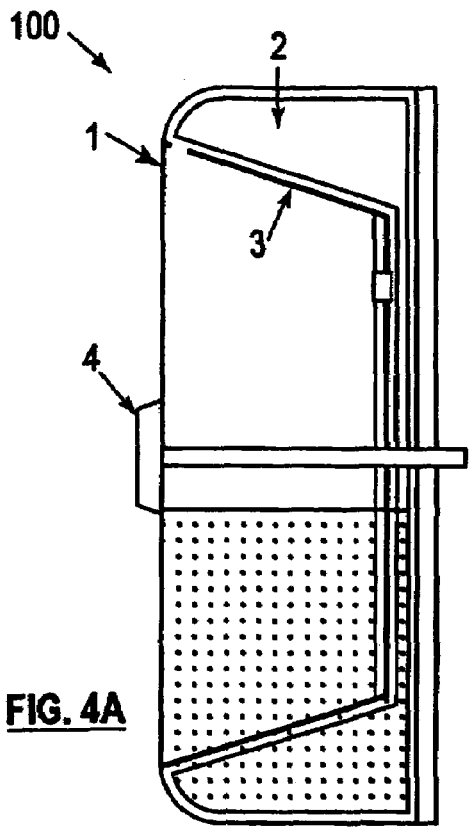
FIG. 4A relates to a cross-sectional side view of a vertically-oriented embodiment of a variable resistance device.
Figure 4B:
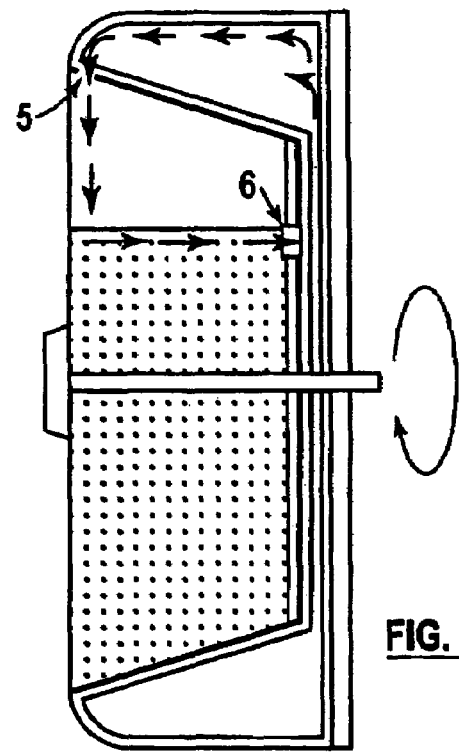
FIG. 4B relates to the embodiment of FIG. 4A, except with the dynamic fluid flow condition illustrated notionally with small arrows.

More detailed illustrations of embodiments of the vertical configuration are shown in FIGS. 2A to 2C, and in FIGS. 4A to 4B. (In FIGS. 4A, 4B and 5, the fluid is indicated with dotted shading).

In an example of the upright embodiment, the inlet 5 is positioned at the top, or close to the top of the secondary chamber 3 so as to be positioned in the best location to allow fluid from the primary chamber 1 to enter the secondary chamber 3 via the inlet 5. However, in other embodiments, an inlet 5 can be positioned elsewhere.

In FIG. 2C (middle diagram), the inlet 5 is shown as a simple circular hole, however, in other embodiments the shape can be modified to include any shape that enables fluid to enter the secondary chamber in a controlled manner.

Having described the simplified diagram of FIG. 12B, fuller illustrative details are shown in FIGS. 2A to 2C. FIG. 2A shows a fully assembled primary chamber 1. FIG. 2B shows the primary chamber 1 surrounded by the rotatable vanes 2. FIG. 2C shows the arrangement with the lid of the primary chamber removed to reveal the secondary chamber 3, having an outlet 6 incorporated in parts of a valve mechanism comprising first and second circular grooves 9A, 8A. (Note: in FIG. 2B as drawn, the upright side walls of the primary chamber 1 and of the secondary chamber 3 have been omitted to reveal the other components, and only the base 12 of the primary chamber is shown). In FIG. 2C, the knob 4 is provided with a lever arm. Rotation of the knob 4 causes rotation of the plate 10. The knob 4 is connected to the plate 10 via hole 14 in the lid.

The surface of the knob 4 can be provided with markings so that the user can selectively turn the knob to achieve the desired degree of resistance.

Another feature of the vertical embodiments is that, upon the user stopping the rotational input-for example, pedaling, rowing or otherwise-the flow of fluid around the chamber (that is providing resistance to the flywheel) will break apart to either side of the resistance chamber. This assists in stopping the rotation when the user's input suddenly ceases. This feature makes the vertical embodiments particularly advantageous for rehabilitation work.

In other embodiments, the slope of the side wall of the primary chamber can be modified. For instance, in the embodiment in FIG. 12B, the side wall slopes downwardly away from the inlet 5. In other modifications the side wall can slow downwardly towards the inlet 5, which would assist in directing the liquid towards the inlet 5. In further variations, the side wall can be perfectly horizontal.

In other modifications, the shape of the inner secondary chamber 3 can be crescent-shaped like a half-crescent-moon, with the curved portion of the crescent-shaped chamber facing downwards, with the flat portion of such a chamber facing upwards. In other words, the inner secondary chamber 3 need not be perfectly circular. Hence, the inner surface of the primary chamber 1 has to be circular, but the actual shape of the inner chamber 3 can vary. In another modification, the inner chamber 3 may be square-shaped.

In some examples of vertical embodiments, the inner surfaces of the primary fluid chamber and/or the outer surfaces of the secondary fluid chamber may be provided with baffles to further hinder the flow of fluid in the primary fluid chamber. The resistance offered by the baffles adds to the resistance that comes from the frictional resistance provided by the inner and outer surfaces, and which comes from the gravitational resistance acting against the vanes 2 that lift the fluid.

As the liquid in the primary chamber 1 increases, this increase in liquid results in increased resistance to the rotation of the vanes 2 that are rotatably housed in the primary chamber. Thus, an increase in liquid in the primary chamber is associated with a decrease in the time taken for the vanes 2 to stop rotating when the user ceases providing rotational input. For example, on the lightest degree of resistance, i.e. the least amount of fluid in the primary chamber, the vanes 2 may take some 10 to 20 seconds to stop rotating when the user ceases providing rotational input. As the liquid level in the primary chamber 1 increases, there is a decrease in the time taken for the vanes 2 to stop rotating.

Other Modifications

The embodiments have been advanced by way of example only, and modifications are possible within the scope of the invention as defined by the appended claims.

In some embodiments, the variation-means may include a valve that controls fluid-flow through the inlet 5 which is entering the secondary chamber 3. As an example, in FIG. 2C, the valve (instead of having triangular openings) comprises a pair of circular grooves. The body of the secondary chamber 3 is provided with a first circular groove 9A, while a rotating plate 10 is provided with a second circular groove 8A. As the user rotates the plate 10 with respect to the secondary chamber 3, the user is able to vary the height of the outlet 6, which is formed at the lowermost point of the parts where the grooves 8A, 9A intersect. On this rotating plate 10 is a sloping flange 16 that is adapted to incrementally block the inlet 5 to vary degrees. Hence, the degree of rotation of the plate 10 will alter the degree to which the flange 16 covers the inlet 5. In FIG. 2C, the flange 16 is arranged such that when there is a greater amount of fluid in the primary chamber 1, the inlet 5 is closed to a greater degree. This ensures that, when there is a greater amount of fluid in the primary chamber 1, the inlet 5 is made smaller, since the greater amount of primary fluid means there is more fluid attempting to enter the inlet 5, hence a lesser need for a large inlet size 5.

Figure 5:
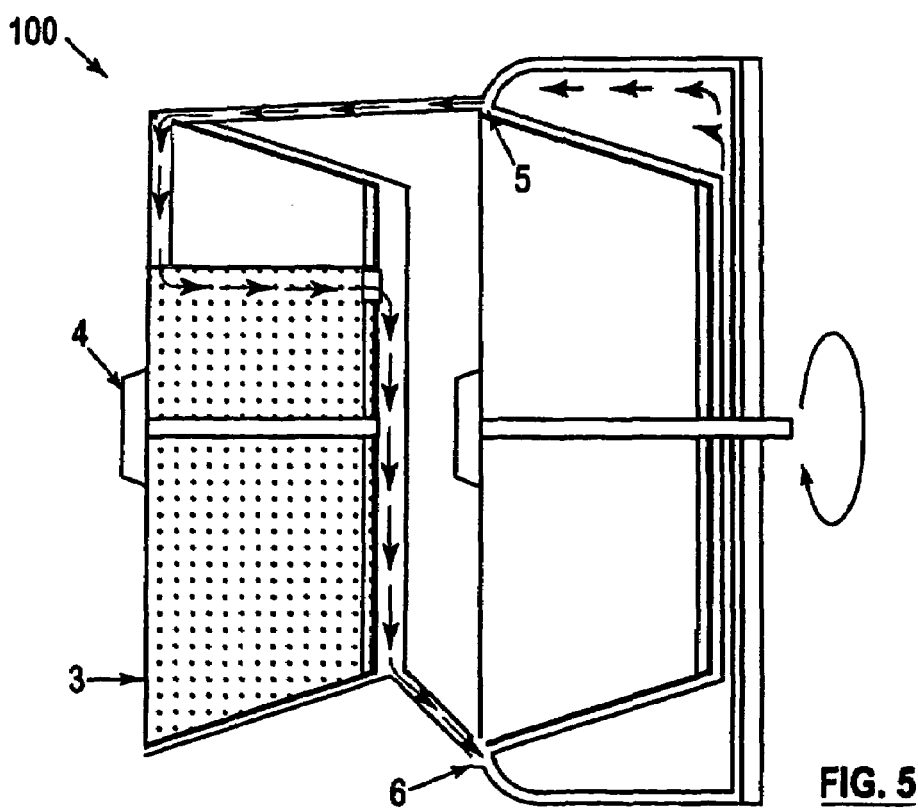
FIG. 5 relates to a further modification of a vertically-oriented embodiment in which the secondary chamber is external to the primary chamber.

FIG. 5 illustrates a modification where the secondary chamber 3 is external to the vertical primary chamber 1.

The components of the primary and secondary chambers 1,3, can be made or metal, plastics or the like, preferably of clear Perspex® or polycarbonate material so that the user can seethe swirling liquid within the chambers. When transparent materials are used, the swirling of the fluid in the chambers presents and attractive visible feature.

In another embodiment, the secondary chamber is external to a horizontal primary chamber, which allows a whirlpool can be created in the centre of the primary chamber.

Although the variation-means as been described above as a mechanism that raises or lowers the height position of the outlet means, other modifications can use a variation-means that controls the flow of liquid through the outlet means by increasing or decreasing the flow-through size of the outlet.

In this embodiment, the preferred fluid is water, but other fluids such as silicon can also be used. Also, the water or fluid can be colored for visual effect.

In the drawings, the valve is positioned off-centre or off-axis of the secondary chamber, but it can also be positioned co-axially.

The shape of the vanes 2 can be varied, so long as these provide a form of paddle that can sweep against the fluid in the primary chamber 1.

The overall diameter of the rotation mechanism can be varied.

In the embodiments, the secondary mechanism includes one secondary chamber 3, but other embodiments can incorporate two or more secondary chambers.

The device may be provided with cooling devices for cooling the fluid.

In an embodiment of another aspect of the invention, a reciprocating mechanism is positioned and adapted to reciprocate within the primary fluid flow region such that the reciprocating mechanism upon reciprocation encounters a degree of resistance dependent on the amount of fluid in the primary fluid chamber, the reciprocating mechanism being adapted to be reciprocate by mechanical input from the exercise machine. Here, the primary and secondary chambers need not be circular, but can be any shape adapted to accommodate the reciprocating mechanism.

In other embodiments, a pumping mechanism, such as a pump, can be used to assist or create the flow of fluid around the fluid flow circuit.

The concept of a fluid flow circuit excludes any prior art in which fluid enters and leaves a chamber via the same opening since this cannot strictly be regarded as a "circuit".

In the illustrated embodiments, the secondary chamber is shown with a frusto-conical-like shape, however, the shape of the secondary chamber can be modified to have upright walls, for example.

In the embodiments, the gap between the outer edge of the vanes 2, and the inner surface of the primary chamber 1, is around 0.25 inch or 5-6 mm.

However, some experimentation can be done to determine an appropriate gap size.

The rotation device in the embodiments are shaped as vanes, however, other embodiments can include blade-shaped paddles or other shapes that can act as a rotatable resistance mechanism.

References to prior art in the body of this specification are not to be taken as an admission that any of the prior art form part of the common general knowledge of the skilled addressee of this invention.

The claims defining the invention are as follows:

1. A variable resistance device incorporated in an exercise machine for providing selectively-variable resistance including:
    an exercise machine;
    a primary fluid chamber adapted to receive fluid therein, the primary fluid chamber having a primary fluid flow region;
    a rotation mechanism having a plurality of fixed vanes, the rotation mechanism being positioned and adapted to rotate within the primary fluid flow region such that upon rotation the vanes encounter a degree of resistance dependent on the amount of liquid in the primary fluid chamber, the rotation mechanism being adapted to be rotated by rotational input from the exercise machine, a gap being defined between the vanes and an inner surface of the primary fluid chamber such that the vanes can rotate without obstruction by the inner surface;
    a secondary mechanism adapted to achieve and maintain an appropriate amount of liquid in the primary fluid chamber to provide a selected degree of resistance for the exercise machine, the secondary mechanism including a secondary fluid chamber adapted to receive fluid therein, the secondary fluid chamber having a secondary fluid flow region, a wall of the secondary fluid chamber being provided with an inlet leading from the primary fluid chamber to thereby allow liquid to flow from the primary fluid chamber into the secondary fluid chamber, the secondary mechanism being provided with an outlet spaced from the inlet to allow liquid to flow out of the secondary fluid chamber and into the primary fluid chamber;
    a fluid flow circuit, which includes said primary and secondary fluid flow regions, through which circuit the liquid flows to establish a circuit-flow condition that repetitively cycles around the circuit from the primary fluid chamber into the secondary fluid chamber via the inlet and then back into the primary fluid chamber via the outlet, the circuit-flow condition being adapted to establish and maintain said appropriate amount of liquid in the primary fluid chamber during use;
    a controller for variably controlling flow of liquid through the outlet to selectively establish different circuit-flow conditions each corresponding to a different appropriate amount of the liquid in the primary fluid chamber to provide a different degree of resistance;
    the secondary fluid chamber is positioned internally within the primary fluid chamber, the primary fluid flow region of the primary fluid chamber is defined by inner surfaces of the primary fluid chamber and by outer surfaces of the secondary fluid chamber, the inner surfaces of the primary fluid chamber form a first circle, the outer surfaces of the secondary fluid chamber form a second circle which is concentric and coaxial with the first circle, the primary fluid flow region being generally between the two;
    the primary fluid chamber and the secondary fluid chamber are arranged such that the amount of liquid contained in the device remains substantially constant.

2. A device of claim 1 wherein the amount of liquid in the primary fluid chamber is able to be ascertained by measuring the level of liquid in the secondary fluid chamber.

3. A device of claim 1 wherein the primary fluid flow region generally surrounds the secondary fluid chamber.

4. A device of claim 1 wherein the primary fluid flow region is arranged generally upright.

5. A device of claim 4 wherein, in use, when a user provides the rotational input, the liquid moves around the primary fluid flow region of the primary fluid chamber and also through the fluid flow circuit, and wherein, in use, when a user ceases providing the rotational input, the liquid in the uprightly-oriented primary chamber falls to bottom of the primary fluid chamber thereby acting as a body of liquid that stops the rotation of the rotation mechanism.

6. A device of claim 1 wherein liquid flows through the inlet exclusively in one direction.

7. A device of claim 6 wherein the controller provides variation means for variably controlling the flow of liquid through the inlet.

8. A device of claim 7 wherein the position of the inlet of the secondary chamber is arranged so as to meet the direction of part of the liquid flow in the primary fluid flow region.

9. A device of claim 1 wherein the controller variably controls the flow of liquid through the outlet by raising or lowering the height position of the outlet.

10. A device of claim 9 wherein the controller includes a first circular groove in the body of the secondary fluid chamber, and a second circular groove in a plate housed within the secondary fluid chamber, the plate being rotatable to select a degree of overlap between the first and second grooves, the outlet being defined by the overlap between the first and second grooves.

11. A device of claim 10 wherein the plate includes a sloping flange for incrementally blocking the inlet in the secondary fluid chamber, the degree of blocking being selectable by rotation of the plate.

12. A device of claim 1 wherein the controller variably controls the flow of liquid through the outlet means by increasing or decreasing the flow-through size of the outlet.

13. A device of claim 1 wherein the liquid in the fluid flow circuit is substantially constant in amount.

14. A device of claim 1 wherein the rotation mechanism is directly connected to the rotational input from the exercise machine without the need for a transmission and/or step-up system.

15. A device of claim 1 wherein the exercise machine is an exercise bicycle.

16. A device of claim 1 wherein the exercise machine is a rowing-simulating exercise machine.

17. A device of claim 1 wherein, in use, the liquid flows substantially continuously between the primary and secondary fluid chambers via the fluid flow circuit.

18. A device of claim 1 wherein the rotation mechanism, upon rotation, encounters a degree of resistance dependent on the level of liquid in the primary fluid chamber.

19. A device of claim 1 wherein the secondary fluid flow region is separate from the primary fluid flow region.

20. A device of claim 1 wherein a pumping mechanism is used to assist or create the flow of liquid around the fluid flow circuit.

21. A device of claim 19 wherein liquid flows through the outlet of the secondary mechanism exclusively in one direction.

22. A variable resistance device incorporated in an exercise machine for providing selectively-variable resistance, including:
   an exercise machine;
   a primary circular fluid chamber adapted to receive fluid therein, the primary fluid chamber having a circular primary fluid flow region;
   a rotation mechanism, which includes rotating vanes, being positioned and adapted to rotate within the primary fluid flow region such that the rotation mechanism upon rotation encounters a degree of resistance dependent on the amount of liquid in the primary fluid chamber, the rotation mechanism being adapted to be rotated by rotational input from a user of the exercise machine, a gap being defined between the vanes and a wall of the primary fluid chamber such that the vanes can rotate without obstruction by the wall, the primary fluid chamber being adapted to be positioned upright in use;
   a secondary fluid chamber adapted to achieve and maintain an appropriate amount of the liquid in the primary fluid chamber to provide a selected degree of resistance for the exercise machine, the secondary fluid chamber having a secondary fluid flow region, a wall of the secondary fluid chamber being provided with an inlet positioned, in use, at or substantially close to the top of the secondary fluid chamber, the inlet allowing liquid to flow from the primary fluid chamber into the secondary fluid chamber, the secondary fluid chamber being provided with an outlet spaced from the inlet to allow liquid to flow out of the secondary fluid chamber and into the primary fluid chamber;
   a fluid flow circuit, which includes said primary and secondary fluid flow regions, through which circuit the liquid flows to establish a circuit-flow condition that repetitively cycles around the circuit from the primary fluid flow region into the secondary fluid flow region and then back into the primary fluid flow region, the circuit-flow condition being adapted to establish and maintain said appropriate amount of liquid in the primary fluid chamber during use;
   a valve that variably controls flow of liquid through the circuit to selectively establish different circuit-flow conditions each corresponding to a different appropriate amount of the liquid in the primary fluid chamber to provide a different degree of resistance;
   wherein, in use, when the user provides the rotational input, the liquid moves around the primary fluid chamber and also through the fluid flow circuit; and
   also wherein, in use, when the user ceases providing the rotational input, the liquid in the uprightly-oriented primary fluid chamber falls to bottom of the primary fluid chamber thereby acting as a body of liquid that stops the rotation of the rotation mechanism;
   the secondary fluid chamber is positioned internally within the primary fluid chamber, the primary fluid flow region of the primary fluid chamber is defined by inner surfaces of the primary fluid chamber and by outer surfaces of the secondary fluid chamber, the inner surfaces of the primary fluid chamber form a first circle, the outer surfaces of the secondary fluid chamber form a second circle which is concentric and coaxial with the first circle, the primary fluid flow region being generally between the two;
   the primary fluid chamber and the secondary fluid chamber are arranged such that the amount of liquid contained in the device remains substantially constant.

23. A variable resistance device as claimed in claim 22 wherein the secondary fluid chamber is in-part encased by the primary fluid chamber.

* * * * *